United States Patent [19]

Rex

[11] Patent Number: 4,554,873

[45] Date of Patent: Nov. 26, 1985

[54] MATERIAL HANDLING AND SORTING SYSTEM

[75] Inventor: Michael P. Rex, Wimborne, England

[73] Assignee: Plessey Overseas Limited, Illford, England

[21] Appl. No.: 414,922

[22] Filed: Sep. 3, 1982

[30] Foreign Application Priority Data

Sep. 4, 1981 [GB] United Kingdom ................ 8126882

[51] Int. Cl.$^4$ .............................................. B61J 3/12
[52] U.S. Cl. .................................... 104/88; 104/130; 209/900; 414/136
[58] Field of Search ................... 209/900; 104/88, 121, 104/130; 105/147; 364/444, 478, 479; 414/134, 136

[56]     References Cited
        U.S. PATENT DOCUMENTS

| | | | |
|---|---|---|---|
| 3,618,531 | 11/1971 | Eichholz | 104/121 |
| 3,643,601 | 2/1972 | Taylor et al. | 104/88 |
| 3,650,216 | 3/1972 | Harwick et al. | 104/88 X |
| 3,734,433 | 5/1973 | Metzner | 104/88 X |
| 3,796,327 | 3/1974 | Meyer et al. | 104/88 X |
| 3,803,556 | 4/1974 | Duffy | 414/134 X |
| 3,803,561 | 4/1974 | Yucius | 414/134 X |
| 3,901,160 | 8/1975 | Aver, Jr. | 104/130 |
| 3,933,099 | 1/1976 | Sieb | 104/88 |
| 4,053,741 | 10/1977 | Ainoya et al. | 364/478 |
| 4,310,276 | 1/1982 | Castagnoli | 414/134 |

FOREIGN PATENT DOCUMENTS

| | | | |
|---|---|---|---|
| 54-42716 | 4/1979 | Japan | 104/130 |
| 54-149105 | 11/1979 | Japan | 104/130 |
| 1370055 | 10/1974 | United Kingdom . | |
| 1378825 | 12/1974 | United Kingdom . | |
| 1397791 | 6/1975 | United Kingdom . | |
| 1408212 | 10/1975 | United Kingdom . | |
| 1411637 | 10/1975 | United Kingdom . | |
| 2022894 | 12/1979 | United Kingdom . | |
| 2113633 | 8/1983 | United Kingdom . | |

Primary Examiner—Robert B. Reeves
Assistant Examiner—Edward M. Wacyra
Attorney, Agent, or Firm—Fleit, Jacobson, Cohn & Price

[57]        ABSTRACT

Mechanized mail sorting offices require packets to be sorted according to destination into one of many bags. A typical mechanized system includes a loading mechanism for transferring packets from stationary input pockets onto a continuously moving sequence of containers which pass all destinations in turn and unload as required. The system according to the invention consists of a number of separate self powered single trolleys (TL) which run on a tracking network. Each trolley (TL) is adapted to be programmed with the route to be taken to the destination of the packet(s) loaded into it. The trolley (TL) co-operates with en-route track-side signposts (TSB) enabling steering arrangements (SM) in the form of a guide arm at the front of the trolley (TL) to guide the trolley around the tracking network to and from its required destination for unloading its package into a bag. Programming is done by operators at induction stations (ISA, ISB, ISC and ISD) at sidings in the tracking network while the trolleys are stationary.

17 Claims, 13 Drawing Figures

MATERIAL HANDLING AND SORTING SYSTEM

BACKGROUND OF THE INVENTION

The present invention relates to a material handling and sorting system, particularly, although not exclusively, for handling and sorting packages within a mechanised mail sorting office. Within such an office packets need to be sorted according to destination into a particular one of many bags. Machines employed for this purpose hitherto, include several loading stations where operators feed-in the packets and indicate their destination, and a mechanism for conveying the packets to destination bags where they are unloaded. A typical system includes loading mechanisms for transferring packets from stationary input pockets onto a continuous moving sequence of containers which pass by all destinations in turn where the packets are unloaded as required. These conventional machines have proved complex and expensive to manufacture.

OBJECTS AND SUMMARY OF THE INVENTION

An aim of this invention is to provide a material handling and sorting system which overcomes the beforementioned disadvantages in an efficient expeditious manner.

According to the present invention there is provided a material handling and sorting system comprising a tracking network including a plurality of loading and induction sidings, a plurality of destination paths including a plurality of associated discharge containers representing particular destinations and a plurality of self-powered trolleys which co-operate with the tracking network and which are capable of carrying a particular material load requiring transportation to a particular destination, each trolly incorporating controllable steering means, wherein the sorting system is so arranged that each trolley is programmed at any loading and induction siding with data relating to the route to be taken to a particular destination whereby the trolley so programmed co-operates with en-route track-side signpost means thereby enabling the steering means to be controlled, to guide said relevant trolley through said tracking network and through its programmed destination at which destination any accompanying material load is automatically discharged into the associated discharge container.

BRIEF DESCRIPTION OF THE DRAWINGS

The invention will be better understood from the following description of an exemplary embodiment which should be read in conjunction with the accompanying drawings, in which.

DETAILED DESCRIPTION OF AN EMBODIMENT OF THE INVENTION

Referring now to the drawings:

General System

Figure 1:
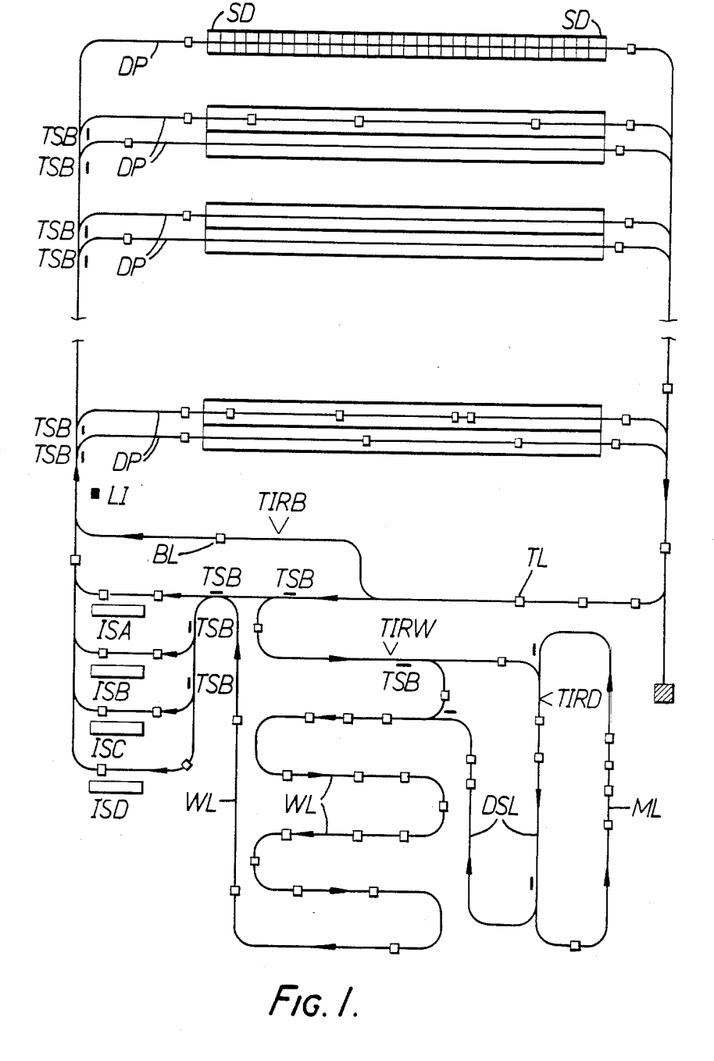
FIG. 1 shows a tracking network in accordance with this invention.

It will be seen that the packet sorting machine comprises a basic tracking network (FIG. 1) which incorporates a number of self powered trolleys TL (FIG. 2) which run on a single continuous track arrangement having upper UT and lower LT rails. The tracking network incorporates four induction and loading stations ISA, ISB, ISC and ISD which are located alongside particular sidings of the track. The network also includes a sorting area which consists of a number of destination paths DP each of which contain sorting destinations SD, and a bypass loop BL, which is employed to permit recirculation of trolleys TL which have not discharged their loads. Trolleys TL, which have discharged their loads, are routed into a waiting loop WL. A diagnostic loop DSL is included for dynamic trolley-tests, while a maintenance loop ML is provided for trolley repairs.

The main principle of operation of the system concerns a sequence of operations which commences with the loading of mail packages at an induction station (ISA, ISB, ISC, ISD) into the compartment CM provided on a trolley, followed by the typing of a code, by an operator at a keyboard KB(A), KB(B), KB(C), KB(D) into a central control system CCS. The code is indicative of a particular destination and by means of an optical communication arrangement SEN1, (FIG. 2, FIG. 4) TC(A), TC(B), TC(C), TC(D) (FIG. 9) between the induction station and the trolley, an outward route which the trolley should take around the track network to the particular destination, and its return route, is programmed into the trolley.

The trolley then moves off around the track network and is guided by track-side signposts in the form of trolley-steering bar-codes TSB (FIG. 7) which are read by the trolley using an optical sensing arrangement which detects and reads the signpost information. The trolley can then make its own decision by means of its own electronics (FIG. 10) as to which direction it should take. Any change in direction of the trolley is controlled by a steering mechanism SM (FIG. 2, FIG. 3) which co-operates with the sides of the upper and lower tracks UT and LT respectively.

When the trolley reaches its programmed sorting destination SD its speed is reduced whereupon the load or packet is automatically discharged into a hopper feeding the appropriate discharge bag. The empty trolley then has its speed increased and it returns to the waiting loop area WL until it is again required.

It is essential to have the moving trolleys spaced at all times at nominal track-speed at a minimum distance apart equal to the deceleration distance. This necessitates the use of distance sensors DS1, DS2, DS3 and DS4, (FIG. 2, FIG. 4) DS3 is used to enable closely packed stationary trolleys to accelerate in an appropriate fashion, and the others to ensure that trolleys running at nominal speed maintain the correct position.

Figure 1A:
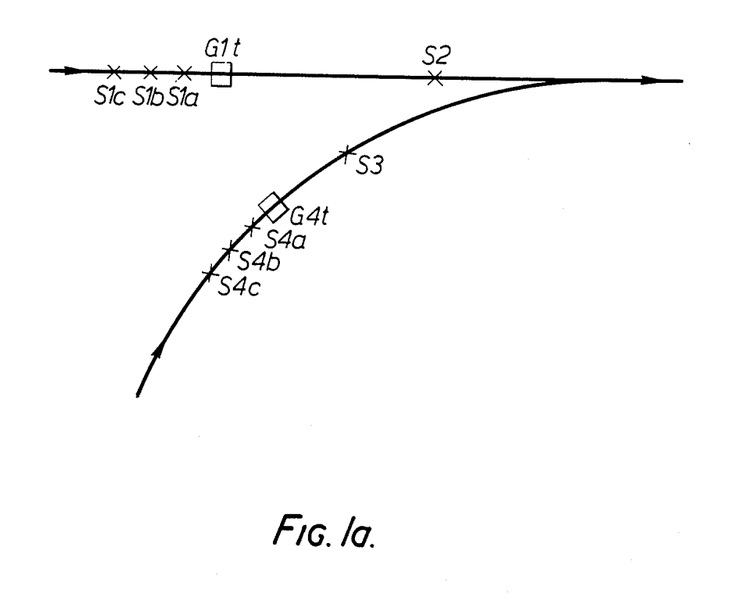
FIG. 1A shows a converging junction section of track where trolleys are required to merge with other trolleys.

It should be noted that there are several trolley identification reading points alongside the track, three of which are indicated at TIRB, TIRW and TIRD together with a lap indicator LI and various other sensors (FI. 1A).

The arrangements of the sorting machine will now be considered in more detail.

Converging Junctions

Once trolleys have been discharged from the induction stations, and are moving at constant velocity on the main track, they will diverge and discharge their load without significant delay. Trolleys will then move to a junction where they will be required to merge with other trolleys from other destination loops, and it is likely that small queues will form at these converging junctions. Delays in trolley flow will be propogated backwards from the junction, and a method of merging is required to control the queue length.

The method employed for controlling the movement of trolleys through a merging junction involves sensing the position of trolleys on each individual input track and appropriately controlling a gate on either track. It is a condition of this method that the gates on each track are mutually exclusive so that no situation ever arises to permit trolleys to collide.

With reference to FIG. 1A, if sensors S1a, S1b, S1c detect a trolley, and then, if there is no trolley at sensor S4a, S4b, S4c the gate G4t goes to 'STOP'. If the sensors detect no trolley between sensors S4a and S3 then gate G1t switches to 'ON' to allow a trolley or a group, or platoon of trolleys, to pass. It can not go to 'STOP' again until there is a gap in its flow, when nothing is detected by sensors S1a, S1b, S1c. Gate G4t will not go to 'NO' until gate G1t is at 'STOP' and there is no trolley between sensors S1a and S2.

This method of merging gives priority to platoons of trolleys once they have started to pass the appropriate gate. While the other track is waiting a platoon of trolleys may be forming there. The forming of platoons is important to achieving the desired flow rate since groups of closely packed trolleys is the only way to produce gaps essential to the operation of this type of merging junction.

The inclusion of track sensors on both tracks enables this sytem to be made fail-safe in the event of a trolley failure within the junction area.

Waiting Loop

There are three main requirements for the waiting loop WL;

(a) When the machine is to be shut down, it is necessary to ensure that all trolleys have been discharged and are at a known location. Similarly, after a power failure, all trolleys must be brought back to a known location, and in so doing, must be discharged of any packet.

(b) In any system, the maximum desired throughput defines the number of trolleys required in the particular installation as a function of the track length. When the throughput is less than maximum, due to a reduction in sorting rate, there is excess trolleys to requirement, and as the system should not circulate empty trolleys, there must be a location in which the excess trolleys can be stored.

(c) In any installation there will be some variation in the track length of the total track loop for the destination loop closest to the induction station, and the destination loop furthest from it. The optimum number of trolleys has to be derived on a system basis, and whatever it is, there is the occasion when the number of trolleys required to meet a given throughput will be less than that on the track. Hence again the excess trolleys have to be stored.

The temporary storage area is the waiting loop WL which is located just prior to the induction stations ISA, ISB, ISC and ISD.

Essentially, the capacity of the waiting area, comprises the waiting loop WL plus the waiting space available at the individual induction stations equates to the total number of trolleys ever likely to be in the system.

Trolley and Track

Figure 2:
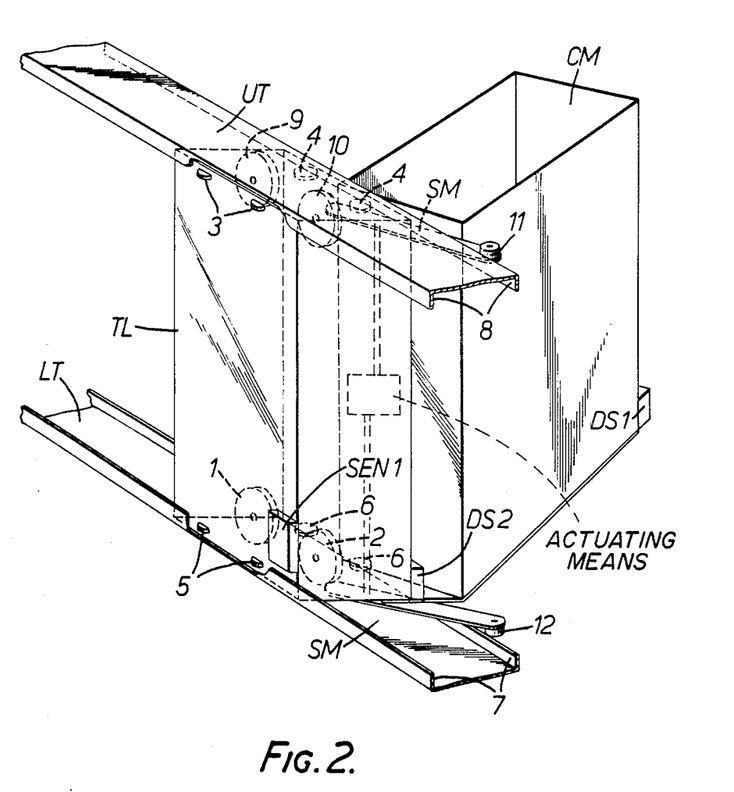
FIG. 2 shows a perspective view of section of track together with a trolley and its accompanying material-carrying compartment mounted on that section.

The trolley TL rides on two in-line driven wheels 1 and 2, and there are four horizontal side-load rollers 3 and 4, together with 5 and 6, at the top and bottom of the vehicle respectively. These side rollers contact the inner surfaces 7 and 8 of the vertical sides of two channel-sectioned rails UT and LT between which the trolley runs, and which are vertically positioned one above the other. The lower channel has standing side-walls while the upper one has hanging side-walls.

Two in-line upper wheels 9 and 10, normally not in contact with the track, are mounted at the top of the trolley to counteract the extreme condition of trolley tilt.

The packet box or compartment CM is supported on the side of the trolley TL, and is cantilevered at an angle of 45° from one side of the trolley. This arrangement permits the complete cross sectional area of the compartment CM to be unrestricted above and below. The compartment is arranged so that the maximum dimension of the packet is accommodated vertically, which in turn prescribes the minimum vertical separation between any track features through which the packet must travel at junctions. The necessity to load/unload the compartment CM simply and reliably is most important which necessitates that the largest cross section packet must be completely outside any track features at loading and discharge positions.

The packet is discharged via a flap (not shown) which is fitted at the base of the compartment CM which is hinged along the leading edge. To control the flap, a solenoid actuated (not shown) is provided at the base of the compartment. The latch is spring loaded in the de-energised 'locked' position, which supports the flap. Signals from track side equipment cause actuation of the solenoid, releasing the flap and holding the latch until the packet has cleared the opening. The trolley then proceeds with the flap open until it reaches a track-side ramp (not shown) at which point the solenoid is again actuated as the flap is raised by the trolley travelling along the ramp. A flat section of the ramp holds the flap in the closed position whilst the latch is re-engaged when the solenoid is de-energised. In the event of solenoid or latch malfunction the flap may remain down, in which case it is detected at a position further along the track, and the trolley is then instructed to enter maintenance loop ML.

Power

The upper track UT carries a power-supply bus-bar (not shown) which is electrically insulated from the track. This supplies power for the trolley on-board electronics and a motor (not shown) which drives the driven wheels 1 and 2.

Steering

The steering mechanism involves the use of two forwardly projecting synchronised guide-arms SM positioned one above the other at the front of the trolley. The arms are pivoted on the track centre line and have rollers 11 and 12, fitted to the top and bottom guide-arms. The arms can be swung over to either one side or the other by actuating means, to place the rollers against the outside of the side walls of the track. By raising the track side walls 13 and 14 (FIGS. 2 and 3) locally through the junctions RHJ and LHJ respectively, the required steering engagement between the track and the roller means is achieved.

Figure 3:
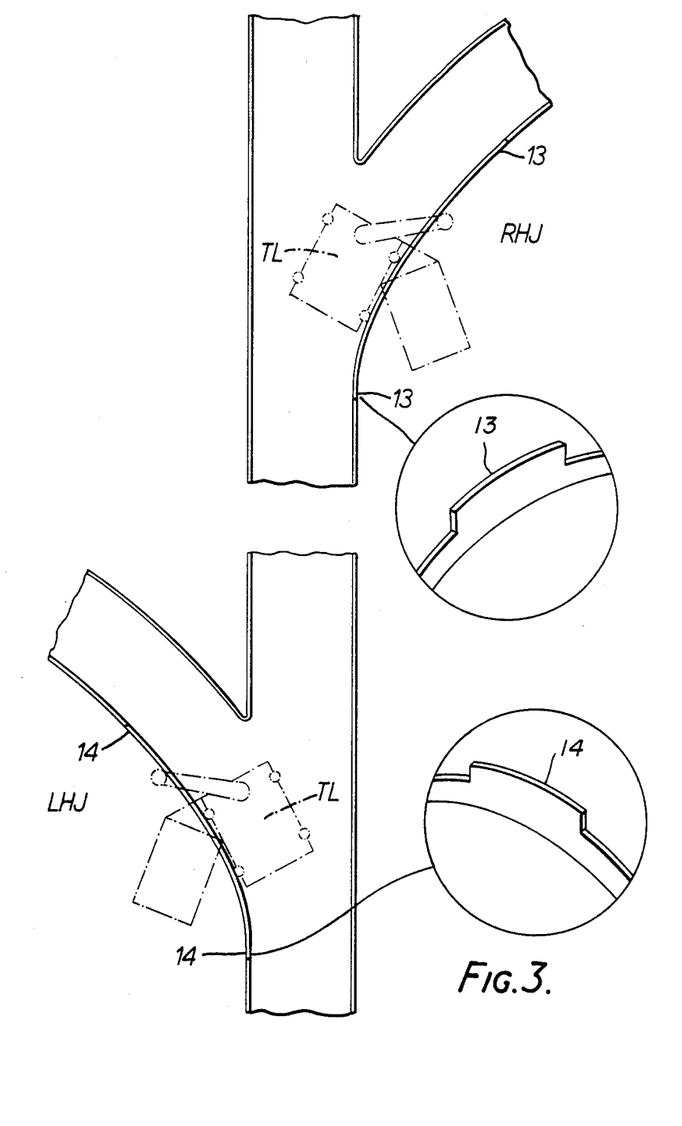
FIG. 3 shows the mechanism for steering a trolley at right and left-hand junctions in the track networks.

By referring to FIG. 3 it will be seen how a trolley TL is directed, at a right-hand junction RHJ, and at a left-hand junction LHJ.

Distance Measuring

As each trolley is self-controlled, a forward sensor arrangement is required to ensure trolleys do not collide with each other. As trolleys only move forward, no rear sensing is necessary. However, the forward sensing must cover a wide enough angle to allow for bends as well as merging and diverging track.

The arrangements involve the use of infra-red beams. In particular receiver/transmitter modules mounted on the front of each trolley with retroreflectors mounted on the rear. As the retroreflectors are passive, this ensures that each trolley is entirely responsible for its own motion.

Figure 4:
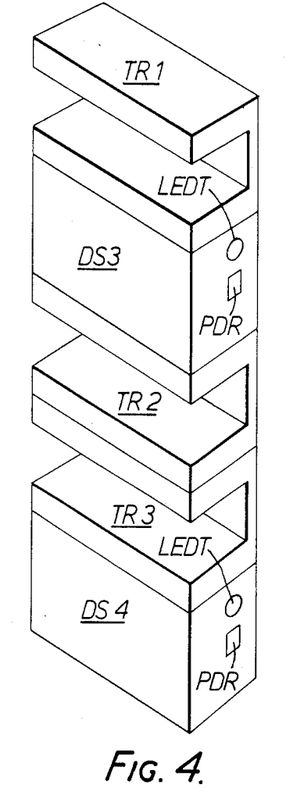
FIG. 4 shows a view of the main sensor unit which is mounted on the trolley.

Light emitting diodes (LED's) LEDT (FIG. 4) are employed for transmitting purposes as they are at their most efficient around the infra-red wave-length and also as infra-red is less susceptible to dust than visible light. The detected infra-red is strobed so that the beams can be distinguished from the ambient light; that is particularly important as incandescent lights emit much infra-red. The reflected beams are detected by photo-diodes PDR (FIG. 4). The four receiver/transmitter modules concerned are DS1, DS2, DS3 and DS4 which are mounted on the front of each trolley to cover all directions required for merging and diverging and to effect a controlled acceleration if stopped behind another trolley. The infra-red beams are reflected off pieces of retroreflective material on the back of the trolley in front. The beams are angled up at about 45° to the horizontal so the distance at which the trolley in front is detected, is set by the height that the retroreflective strip is affixed above the receive/transmitter module.

Sign Posting

When the trolley leaves the induction station it has to independently find its own route to the destination. To achieve this there are signposts TSB (FIG. 1) provided to tell the trolley where it is so that it can decide where to go. The reading of the signpost is carried out irrespective of the speed of the trolley which may be changing as it passes the signpost, and the signpost is changeable (CBC, FIG. 8) so that, for instance, 'bag full' and steering codes can be accommodated. A redundant code is provided for error checking.

Figure 6:
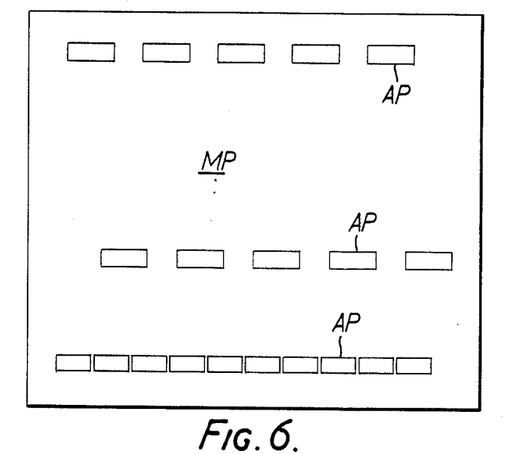
FIG. 6 shows a front view of a mounting plate with apertures provided for inserting pegs as illustrated in FIG. 8.

The arrangements involve the use of an optical sensor means which emits an (infra red) beam and which is broken by physical bars (FIG. 8) mounted in apertures AP on a mounting plate MP (FIG. 6 and FIG. 7) positioned on the side of the track. As each bar passes through the beam it casts a shadow on a photodiode and is thus detected. It has the advantage that it is fail-safe in that the beams are always being monitored even when no sign-posts are being read.

Figure 5:
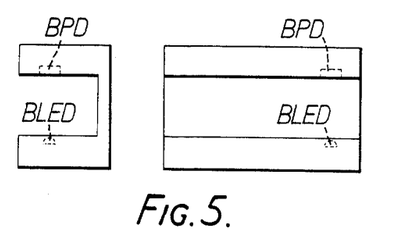
FIG. 5 shows front and end views of a bar code reading module incorporated in the main sensor unit of FIG. 4.

FIG. 5 shows the sensor means which is a transmitter in the form of an LED (BLED) and a receiver in the form of a photo-diode BPD. Three such transmitter/receivers are employed in the main sensor unit as shown in FIG. 4 TR1, TR2 and TR3.

Figure 7:
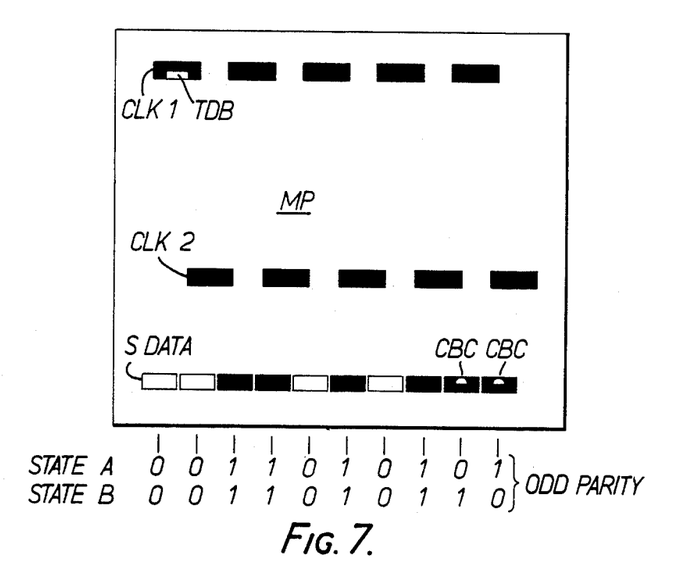
FIG. 7 shows a front view of a mounting plate in which pegs, which are used to form a bar-code, (as shown in FIG. 8) have been inserted to produce desired data codings and clocks.
Figure 8:
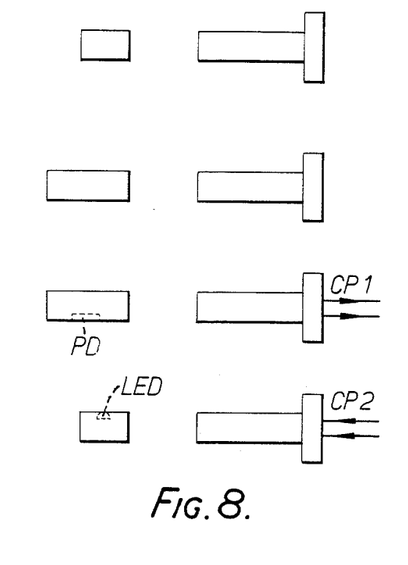
FIG. 8 shows front and side views of the various pegs which form clock and data bars employed in the mounting plate of FIG. 6.

The altering of codes, when required during the normal operating, is done by putting LED's on the bars FIG. 8 so they cast no shadow. Control is carried out over the conductor pairs CP2. It is also possible to incorporate a photo-diode PD in bar as in the trolley detect bar TDB (FIG. 7, FIG. 8). Signals received here are transmitted over the conductor pair CP1.

Figure 11:
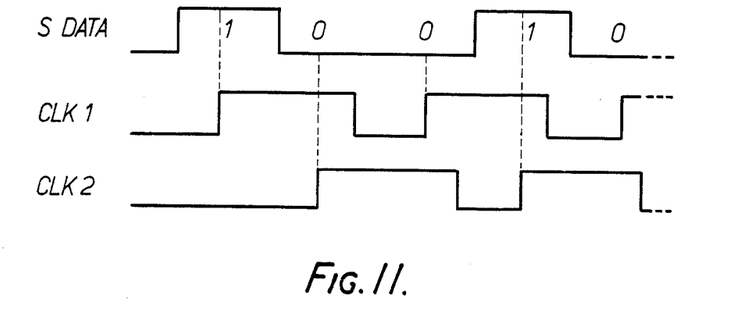
FIG. 11 shows a portion of relative waveforms of the data and two clocks as sensed from a mounting plate employed as a track-side sign post; and, FIG. 12 shows a schematic of a section of the track network indicating several points around the track which are considered for describing a particular operational sequence.

The arrangement employed for optical communication involves a serial data track SDATA (FIG. 7 and FIG. 11) and two clock tracks CLK1 and CLK2 (FIG. 7 and FIG. 11). The two clock tracks are necessary to cope with possible trolley rock (if a trolley stops at a barcode) which may cause one pulse edge to be seen twice.

This serial method has the advantage that its length is easily adaptable to suit the amount of data to be transferred. To reduce errors caused by glitches, each bit can be read several times. The use of a redundant code, e.g. a parity bit reduces the possibility of undetected errors and thus the likelihood of missorts.

The two clock tracks CLK1 and CLK2 are out of phase, so the trolley expects to detect a light-to-dark transition on alternate clock tracks. This allows the trolley to recognise the difference between rocking over one clock edge and normal reading (FIG. 11).

Referring to FIG. 11, if the data transmitter or receiver fails, then the trolley reads all ones or all zeros which are invalid codes. If CLK1 transmitter or receiver fails, then the trolley reads several consecutive pulses on CLK2. If CLK2 transmitter or receiver fails, then the trolley reads CLK2 first, which is invalid.

This means that failures of any of the bar-code reading equipment is easily detectable. When detecting an error, the trolley stops and flashes a HELP LED (FIG. 10) to indicate that it should be removed from the track and serviced.

Description of the Bar-Code

The total bar-code is 10 bits long, two type bits, seven identity bits and one parity bit.

'Bag ahead' codes use six bits to define the bag number and one bit to indicate 'bag full'. Discarding all 1's and all 0's as errors this leaves 62 codes per loop. Two of these codes will be dedicated to 'default drop' and an obligatory 'open flap' leaving 60 different codes per loop of track.

The 'diverge' and 'end of junction' codes use six bits to define the junction number. The diverge uses the seventh bit to indicate the fastest way for the trolley to get 'home' in case of a power cut where a trolley may forget where it is. The 'end of junction' code uses the seventh bit to tell the trolley whether it went right or left at the last junction as a check of the correct operation of the trolley.

With 'special' codes, each of the seven identity bits has a separate meaning and they can be used in combination to suit the requirement. The 'calibration marker' is used on two codes a known distance apart so the trolley can calibrate its own speed. The 'turn' bit is obligatory and tells the trolley which way to go. This bit may be under computer control. The 'lap/bypass' marker tells the trolley it is about to complete one lap, if it wants to go round again it must turn right (say) onto the bypass loop BL. The 'loading bay marker' tells the trolley that it is in an induction station and must stop at the communications point. The 'do not creep' marker is used at traffic lights so that trolleys do not creep through a 'red light'. The diagnostic marker tells the trolley that to enter the diagnostics loop DSL, it must turn the opposite way to the obligatory turn bit. The 'reset flap' is used to de-energise the release flap relay once the flap is back in position, after the trolley has dropped its packet.

The parity bit is used negative (odd number of 1's parity).

BAR CODE FORMAT
Ten Bit Code
XXXXXXXXXX
Two bit type code:
    00 Bag Ahead (Max. 60 empty, 60 full)
    01 Diverge (62 turn left for home, 62 turn right for home.
    10 End of Junction Check
    11 Special Codes XXXXXXXXXX
Seven bit number code:
OOXXXXXXXFP  Bag Ahead  60 codes on 6 bit define bags. 7th bit indicates 'bag full' (F).
01XXXXXXHP  Diverge  62 codes on 6 bits define location. 7th bit indicates direction for 'home'(H)
10XXXXXXLP  End of Junction  Two sets of 62 codes corresponding to the diverge codes. (L = direction)
11XXXXXXXP  Special Codes  Bit 0 Calibration Marker Bit 1 Turn right or left (1 or 0) Bit 2 Lap/Bypass marker Bit 3 Loading bay marker Bit 4 DO NOT CREEP Bit 5 Diagnostics marker Bit 6 Reset Flap One or any combination of these bits may be set. Turn left/right is usually obligatory unless trolley knows it wants the diagnostics (Bit 5) because of internally diagnosed fault or -continued XXXXXXXXXX  Single bit for parity (p) parity error.

All 1's or all 0's in the 10 bit code will be considered invalid.

Data Communication

Once a trolley has left the induction station, where it collects its packet, it is 'on its own' in finding its way to its destination. This means that it is essential to have communication with the trolley at the station. The same transducers as the 'signpost' readers are used for this function. These are infra-red light beams, as already described, and as the trolley stops in the induction station it would not otherwise be using them.

In an induction station the trolley stops on seeing its beams broken by three bars (not shown). Each of these has a receiver/transmitter pair in them providing a two-way communication channel TC(A), TC(B), TC(C), TC(D), (FIG. 9) with the trolley on each of the three bars.

The loading bay then sends the start of message code (seven 1's) two bits at a time clocked by the third. On receiving this back correctly it proceeds to send a series of eight bit codes which represent the route of the trolley.

1XXXXXXP represents a 6 bit diverging junction code where the trolley turns right, it will turn left at all others.

0XXXXXXP represents a 6 bit bag code where the packet should be dropped.

The 8th bit is used as a parity bit. When all the codes are given then the go signal (seven 0's) is given, and the trolley moves off.

A number of junction and bag codes can be stored up to a maximum of 8 bytes. The trolley follows the junction code instruction, in order, then searches for the bag numbers, in order.

Control System

The control system (FIG. 9) consists essentially of a central control system CCS which intercommunicates with a number of outstations by transmission of data in 1 MHZ serial form over transmission paths TP1, TP2, TP3, TP4, TP5, TP6, TP7, TP8 and TP9.

Figure 9:
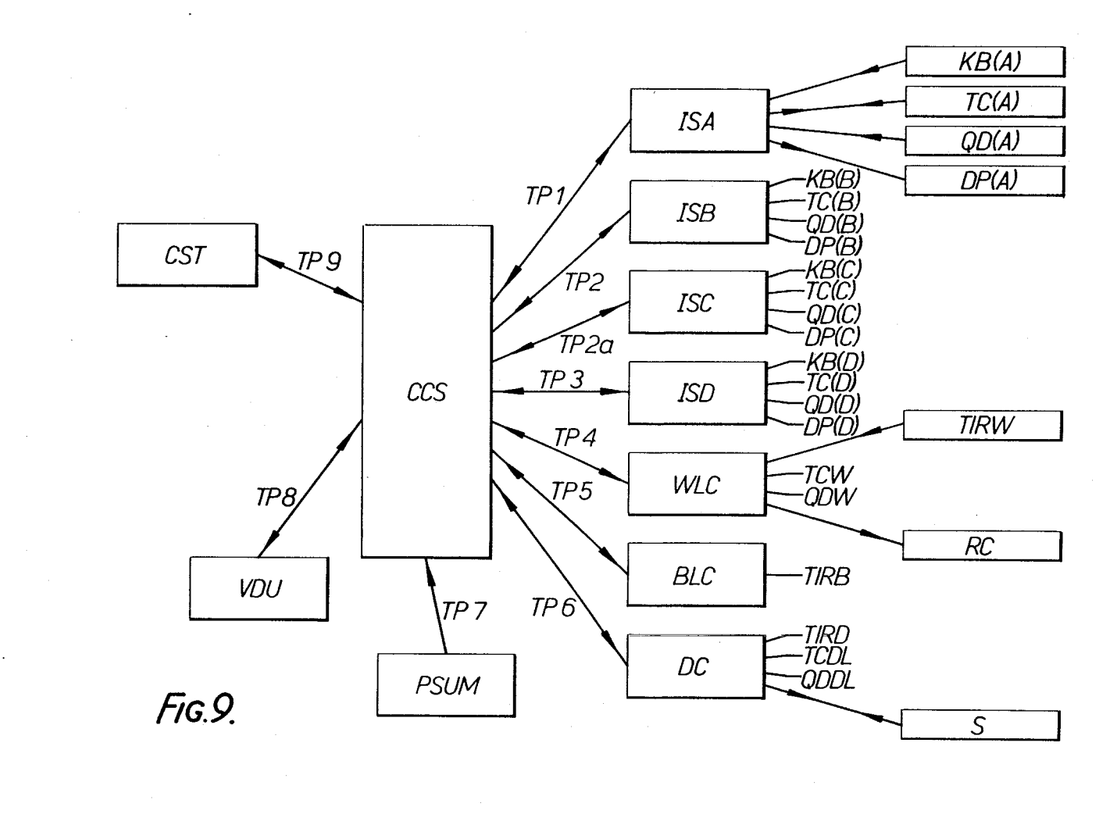
FIG. 9 shows the basic block schematic diagram of the central control arrangement for the material handling and sorting system in accordance with this invention.

The outstations comprise four induction stations ISA, ISB, ISC and ISD, at which postal officers load trolleys and communicate with the stations via coding keyboards KB(A), KB(B), KB(C) and KB(D) and also receive messages via a display DP(A), DP(B), DP(C) and DP(D). The induction stations are in fact intelligent out-stations which are capable of performing code/sort translating (with the use of the code sort translator CST) upon receipt of coding keyboard data, displaying error messages, and communicating with the central control system and with a trolley in its loading bay.

Other outstations the wait loop controller WLC, bypass loop controller BLC and diagnostics controller DC each monitor the passage of trolleys along the respective loops at sensor points TIRW, TIRB and TIRD. The wait loop controller WLC and the diagnostics controller DC also control the routing of trolleys into the wait loop WL and into the diagnostics loop DSL respectively. These two controllers are also adapted for communication with the trolleys at points TCW and TCDL and with the central control system to check the forward looking sensors of the trolleys and to check operation of the motor, packet release mechanism, and trolley steering SM.

The induction stations, wait loop controller and diagnostus controller each cater for queue monitoring at points QD(A), QD(B), QD(C), QD(D), QD(W) and QDDL.

A further outstation, the power monitor PSUM, performs two tasks, it ensures a sequential start-up and shut-down of the track power supplies to reduce the surge current. This is done automatically or by a command from the central control system. If the monitor detects fault conditions it transmits alarm signals to the central control system and shuts down the power supplies.

A visual display unit VDU is provided to facilitate direct communication with the central control system CCS via a VDU/keyboard terminal (not shown), for instance, by an engineer.

Trolley Electronics

Figure 10:
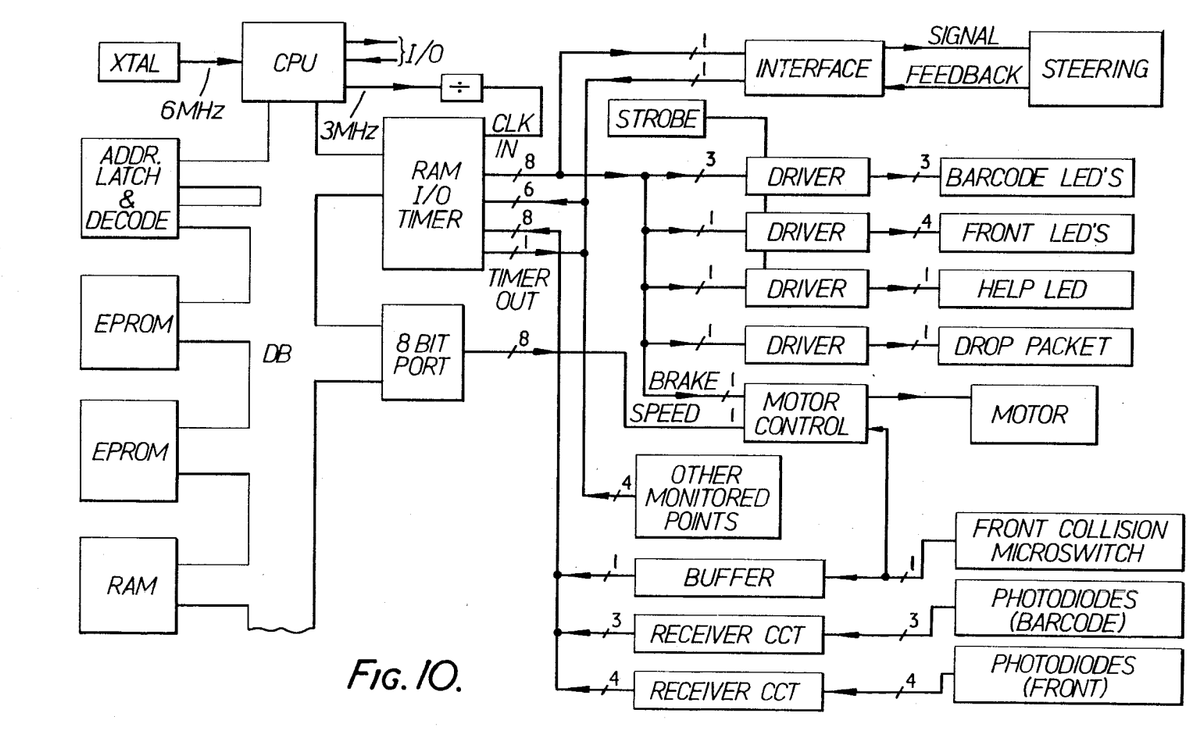
FIG. 10 shows a block diagram of the electronics incorporated on-board the trolley.

Referring now to FIG. 10, all the electronics shown is adapted for mounting on a single printed circuit board. The supply, regulation and motor drive power stage are, however, mounted on a heat sink.

The heart of the trolley electronics is a micro-processor CPU linked to erasable programmable read-only memories EPROM, an address latch and decode unit ADDR LATCH & DECODE, random access memory RAM with I/O, TIMER and an 8 BIT PORT by means of a data bus DB.

The microprocessor CPU clock eminates from a crystal XTAL at 6 MHZ and a 3 MHZ output from the CPU is divided ($\div$) to provide the input clock CLK IN for the RAM I/O TIMER.

The program for operation of the trolley electronics is contained in the EPROM's and which is run, inter-alia, in accordance with information received from the steering STEERING, microswitch sensor FRONT COLLISION MICROSWITCH, the barcode photodiodes PHOTODIODES (BARCODE) in the main sensor unit SEN1, and in the front sensor photodiodes PHOTODIODES (FRONT) in the four front sensors DS1, DS2, DS3 and DS4 on the trolley. The steering STEERING, signalling SIGNAL, and feedback FEEDBACK, is controlled through an interface INTERFACE.

As has been mentioned previously, the light emitting diodes LED's are strobed. This is achieved by the strobe unit STROBE feeding the drivers DRIVER for the main sensor unit, SEN1, LED's, BARCODE LED's of the front sensors DS1, DS2, DS3 and DS4, LED's FRONT LED's and the previously mentioned HELP LED.

It will be noted that the operation of the actuator DROP PACKET for dropping the flap to enable the packet to drop from the compartment CM, also incorporates a driver unit DRIVER. Miscellaneous monitoring points on the trolley are represented by OTHER MONITORING POINTS. These monitor the front sensor LED's for example.

There are eight input/output lines to control trolley speed SPEED giving 256 steps between stopped and full speed. One input/output line is used for the brake BRAKE, if required, to keep the trolley stationary once it has stopped even if another trolley nudges up behind.

The BRAKE and SPEED signals are sent to the motor control MOTOR CONTROL and then to the motor MOTOR. The motor can be stopped in the event of collision by a microswitch FRONT COLLISION MICROSWITCH.

Operational Example

Figure 12:
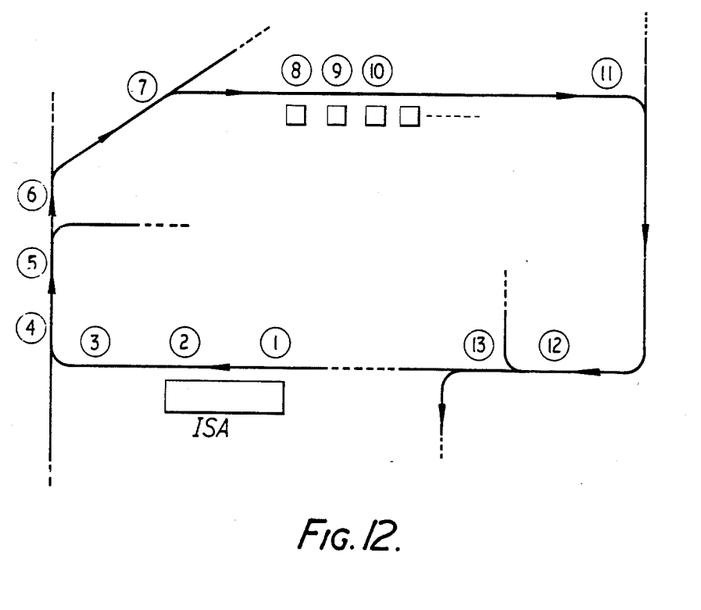

An example of the operation of the system now follows, and reference should be made to FIG. 12.

---

1. Trolley travelling along joins the queue in the induction station ISA.
2. Trolley gets induction station code 1100010000 then moves under the communication area and stops.
It receives

1 1111111,0        START OF MESSAGE
    1 1,110110,0       Right at 110110
    2 1,101100,1       Right at 101100
    3 0,010111,1       Drop at 010111 (1st choice)
    4 0,011010,0       Drop at 011010 (2nd choice)
    5 0 000000,1       GO Five words stored in random access memory RAM Trolley moves off.

3. Trolley reads 1101001001 special, Turn Right, Do not creep. Here the trolley encounters a 'traffic light' where it stops and does not creep through. The traffic light indicates 'go' and the trolley moves on to the junction.

4. Trolley reads 1100000001 sets it to default state. Trolley moves on.

5. Trolley reads <u>0 1</u>  0  <u>1 0 1 1 0 1</u>  0

As the junction code does not match with the first one of its list it goes left.
Trolley reads <u>1 0</u>  0  <u>1 0 1 1 0 1</u>  0

6. Trolley reads <u>0 1</u>  0  <u>1 1 0 1 1 0</u>  0

As this matches with its first direction the trolley goes right here.
Trolley reads <u>1 0</u>  1  <u>1 1 0 1 1 0</u>  1

Trolley confirms this as correct and goes back to its default turn left state.

7. Trolley reads <u>0 1</u>  1  <u>1 0 1 1 0 0</u>  0

This matches with the trolley's second code to trolley turns right.

-continued

Trolley reads 1 0  1  1 0 1 1 0 0  0
- Parity
- Check code
- Gone right
- End of junction This confirms the correct turn so trolley goes back to its diverge left, default state.
Trolley sees its next code to look for is a bag.

8. Trolley reads 0 0  0 1 0 0 1 1  0 0
- Parity
- Bag not full
- Bag code
  (Does not match)
- Bag ahead Does not match, trolley goes on.

9. Trolley reads 0 0  0 1 0 1 1 1  1 0
- Parity
- Bag Full
- Bag code (matches)
- Bag ahead Does match but bag full so go on to second choice.

10. Trolley reads 0 0  0 1 1 0 1 0  0 0
- Parity
- Bag not full
- 2nd choice agrees
- Bag ahead This matches so the packet is dropped according to its dropping sequence.
The trolley now ignores all other bag ahead codes and follows any 'home' instructions to get back to the wait loop WL.

11. Trolley reads 1101001001, special, turn right, do not creep.
Traffic light already in its favour so it carries on.
*At this point the reset drop flag may be needed. It then reads 110000001, set to default state. And carries on.

12. At the bypass junction
Trolley reads 1100100000, Bypass
Trolley does not want to bypass so it obeys the turn left bit (*).

13. Trolley reads 1100000001 Turn Left,
Brings trolley into wait loop.
If it were changed to turn right the diagnostics marker would come up to tell it to keep left to get to diagnositcs if it had self diagnosed a fault.

I claim:

1. A material handling and sorting system comprising:
   a tracking network including a plurality of loading and induction sidings and en-route track-side signpost means;
   a plurality of destination paths including a plurality of associated discharge containers representing particular destinations;
   a plurality of self-powered trolleys which co-operate with the tracking network and which are capable of carrying a particular material load requiring transportion to a particular destination, each trolley incorporating controllable steering means;
   each induction siding incorporates an induction station, the induction station including input means arranged for entering coded data indicative of a particular destination into said induction stations, said coded data is transmitted from said induction stations to a central control system which is arranged to translate said coded data into routing data for programming a trolley;
   an optical communication-channel is provided between the induction station and the trolley, said routing data being transferred to said trolley over said communication channel, said communication channel being a two-way channel comprising receiver/transmitter pairs incorporating photo-diodes and light-emitting diodes respectively which are optically coupled to optical sensor means on said trolley;
   said signpost means includes signpost information with a serial data track and two clock-tracks, said serial data and clock tracks comprising physical bars mounted in apertures on a mounting plate wherein each bar is arranged to pass through an infra-red beam passing between a light emitting diode transmitter and photo-diode receiver in said optical sensor means thereby casting a shadow on said photo-diode to detect a signal; and
   each said trolley incorporates a micro-processor and first and second data storage means, said routing data being entered in said first data storage means and a trolley operator program being stored in the second data storage means, wherein, upon the program being run, the routing data is compared with said signpost information read from said signpost means by said optical sensor means to control the trolley appropriately around the tracking network;
   wherein the sorting system is so arranged that each trolley is programmed at any loading and induction siding with data relating to the route to be taken to a particular destination whereby the trolley so programmed co-operates with said en-route trackside signpost means thereby enabling the steering means to be controlled, to guide said relevant trolley through said tracking network and through its programmed destination, at which destination any accompanying material load is automatically discharged into the associated discharge container.

2. A material handling and sorting system as claimed in claim 1, in which said tracking network includes a track which comprises vertically spaced upper and lower rails between which said trolley runs, and a plurality of left-hand and right-hand track junctions, at which trolley directions are controlled.

3. A material handling and sorting system as claimed in claim 2, in which said upper and lower rails are channel-sectioned with the upper rail incorporating hanging side-walls and the lower rail incorporating standing side-walls.

4. A material handling and sorting system as claimed in claim 3, in which said steering means comprises a forward projecting guide-arm at the front of the trolley pivoted on the track centre-line and which co-operates with the track.

5. A material handling and sorting system as claimed in claim 4, in which the guide-arm includes rollers which co-operate with the side of the track.

6. A material handling and sorting system as claimed in claim 5, in which said steering means comprises two forwardly projecting synchronised guide-arms positioned one above the other at the front of the trolley and which includes roller means which co-operate with the hanging and standing side walls respectively of the track.

7. A material handling and sorting system as claimed in claim 6, in which the arms are swung over, by actuating means to either one side or the other of the track to place the roller means on the outside of the side walls of the track in accordance with the direction the trolley is to be guided.

8. A material handling and sorting system as claimed in claim 7, in which the hanging and standing side-walls of the track are raised locally through the track junctions to obtain the required steering engagement between the track and the roller means.

9. A material handling and sorting system as claimed in claim 1, in which each trolley includes a compartment incorporating controllable flap-means enabling said load to be discharged as required.

10. A material handling and sorting system as claimed in claim 1, in which said input means is an operator controlled coding keyboard.

11. A material handling and sorting system as claimed in claim 1, in which three receiver/transmitter pairs are incorporated at said induction station.

12. A material handling and sorting system as claimed in claim 1, in which said optical sensor means is a main sensor unit incorporating three transmitter/receiver units.

13. A material handling and sorting system as claimed in claim 12, in which a forward sensor arrangement is provided to ensure that trolleys do not collide with each other, the forward sensor arrangement comprising receiver/transmitter modules mounted on the front of each trolley and retroreflectors mounted on the rear, wherein an infra-red beam transmitted from a transmitter on a first trolley is reflected from said retroreflector of a second trolley ahead of said first trolley and only received by a receiver of said first trolley at a predetermined distance being attained between said first and second trolleys whereupon a change in speed of said first trolley is effected.

14. A material handling and sorting system as claimed in claim 13, in which said infra-red beams are angled at 45° to the horizontal.

15. A material handling and sorting system as claimed in claim 14, in which there are four receiver/transmitter modules two of which are incorporated in said main sensor unit.

16. A material handling and sorting system as claimed in claim 12, in which at converging junctions sensor means detect the position of trolleys to control gate means on the track leading to the converging junction.

17. A material handling and sorting system as claimed in claim 16 in which the tracking network includes a waiting loop for temporary storage of trolleys.

* * * * *